(12) United States Patent
Jennings et al.

(10) Patent No.: US 9,051,073 B2
(45) Date of Patent: Jun. 9, 2015

(54) MEASURING AND DISPENSING CONTAINER (76) Inventors: Robert M. Jennings, Oldwick, NJ (US);
David A. Jennings, Mountainside, NJ (US)

( * ) Notice: Subject to any disclaimer, the term of this patent is extended or adjusted under 35 U.S.C. 154(b) by 44 days.

(21) Appl. No.: 12/954,318

(22) Filed: Nov. 24, 2010

(65) Prior Publication Data

US 2011/0127297 A1 Jun. 2, 2011

Related U.S. Application Data (63) Continuation-in-part of application No. 11/643,341, filed on Dec. 21, 2006, now abandoned.

(51) Int. Cl.
| | |
|---|---|
| *B65D 37/00* | (2006.01) |
| *B65D 1/02* | (2006.01) |
| *G01F 11/28* | (2006.01) |
| *B65D 23/00* | (2006.01) |
| *B65D 25/56* | (2006.01) |
| *G01F 11/26* | (2006.01) |

(52) U.S. Cl.
CPC ............ *B65D 1/0223* (2013.01); *G01F 11/286* (2013.01); *B65D 23/00* (2013.01); *B65D 25/56* (2013.01); *G01F 11/262* (2013.01)

(58) Field of Classification Search
CPC ... G01F 11/286; G01F 11/288; G01F 11/262; B65D 1/0223; B65D 23/00; B65D 25/56
USPC ......... 222/158, 205, 207, 211, 454, 456, 212, 222/213; 215/3, 6; D9/524, 547, 741
See application file for complete search history.

(56) References Cited

U.S. PATENT DOCUMENTS

| | | | | |
|---|---|---|---|---|
| 1,308,713 | A | * | 7/1919 | Kilpatrick et al. ............ 222/158 |
| 1,993,001 | A | * | 3/1935 | Geyer ............................ 222/158 |
| 4,079,859 | A | | 3/1978 | Jennings |
| 4,298,038 | A | | 11/1981 | Jennings |
| 4,646,948 | A | | 3/1987 | Jennings |
| 4,893,732 | A | | 1/1990 | Jennings |
| 6,022,134 | A | * | 2/2000 | Andrews ....................... 366/130 |
| 6,290,102 | B1 | | 9/2001 | Jennings et al. |
| 7,467,735 | B2 | * | 12/2008 | Rau ............................ 222/464.1 |
| 2008/0067195 | A1 | * | 3/2008 | Jennings et al. ............... 222/205 |

FOREIGN PATENT DOCUMENTS

| | | | | |
|---|---|---|---|---|
| EP | 0015560 | * | 9/1980 | ................... 222/205 |
| GB | 2 038 779 | A | 7/1980 | |

* cited by examiner

*Primary Examiner* — J. Casimer Jacyna
(74) *Attorney, Agent, or Firm* — Ladas & Parry LLP (57) ABSTRACT

A container for measuring a predetermined amount of liquid and dispensing that measured amount. The container includes a reservoir chamber, a measuring and dispensing chamber, and a conduit or tube for transferring liquid from the reservoir chamber to the measuring and dispensing chamber. The reservoir chamber has flexible walls which can be squeezed to drive liquid from the reservoir chamber into the measuring chamber. The passage from the reservoir to the measuring and dispensing chamber is configured and its outlet arranged so that liquid entering the chamber flows down a wall thereof.

16 Claims, 13 Drawing Sheets

MEASURING AND DISPENSING CONTAINER

RELATED APPLICATION

This is a continuation-in-part of application Ser. No. 11/643,341 filed on Dec. 21, 2006 now abandoned, the contents of which are incorporated herein by reference.

BACKGROUND OF THE INVENTION

Measuring and dispensing containers having a reservoir or storage chamber and a measuring chamber arranged to receive a predetermined amount of liquid from the reservoir chamber and subsequently dispense that predetermined amount of liquid are known. Examples of such measuring and dispensing chambers are disclosed in U.S. Pat. Nos. 4,079,859; 4,298,038; 4,646,948; 4,893,732; and 6,290,102

U.S. Pat. No. 4,646,948 discloses a number of embodiments of containers in which liquid is poured from a reservoir chamber to a measuring chamber. When the desired amount of liquid has accumulated in the measuring chamber, surplus liquid is returned to the reservoir chamber by controlled tilting of the container and then the measured accumulation is dispensed from the measuring chamber.

U.S. Pat. No. 4,893,732 provides a drain back opening in a wall of a measuring chamber whereby, when the measuring chamber is overfilled from a reservoir chamber, surplus liquid will drain back into the reservoir chamber leaving a predetermined measured amount of liquid in the measuring chamber to be dispensed therefrom.

U.S. Pat. No. 6,290,102 is an example of a measuring and dispensing chamber in which transfer of liquid from the reservoir or storage chamber to the measuring chamber is effected by way of a tube or conduit. Transfer is effected by squeezing the reservoir or storage chamber to force liquid through the tube and into the measuring and dispensing chamber. In that example, it is important to locate the lower (upstream) end of the tube in a position that, when the container is tilted to discharge liquid from the measuring and dispensing chamber, the lower upstream end of the tube is clear of liquid in the reservoir or storage chamber.

British Patent Publication GB 2038779 describes a dispensing container in which a dispensing receptacle of defined volume is linked to a deformable squeeze-bottle and by squeezing the bottle, liquid can be forced into the dispensing receptacle. The conduit linking the squeeze bottle with the dispensing receptacle is horizontal and at the top of the container with the risk that liquid being squeezed from the squeeze bottle into the dispensing receptacle may splash out of that receptacle when it hits the wall of the dispensing receptacle thereby causing safety problems, particularly if the liquid being dispensed is hazardous in some way, for example in the case of some agricultural or horticultural materials.

Our application Ser. No. 11/643,341 describes ways of utilizing such measuring and dispensing chambers in containers in which the reservoir is made of deformable material so that liquid can be "squeezed" from the reservoir to the measuring container and utilizes a shaped conduit to minimize the risk of liquid being sucked back into the reservoir when the squeeze is released. Reference is also made to the desirability of the liquid entering the reservoir chamber in a downward direction.

We have found that unlike the situation wherein liquid is transferred from a rigid reservoir chamber to a measuring and dispensing chamber, when a squeezable reservoir is used, liquid enters the measuring and dispensing chamber at a velocity such that if steps are not taken to prevent it, liquid becomes sprayed against the measurement markings or begins to foam making it difficult to make accurate determinations as to when liquid in the measuring and dispensing chamber has filled it up to any desired marking.

SUMMARY OF THE INVENTION

According to the present invention there is provided a measuring and dispensing container having a flexible walled reservoir chamber, a measuring and dispensing chamber at least one wall of which bears measurement markings, and a conduit for transferring liquid from said reservoir chamber to said measuring and dispensing chamber, wherein liquid entering the measuring and dispensing chamber is directed to cause it to run down a wall of the measuring and dispensing chamber.

The conduit may be of any convenient form that permits liquid to be 'squeezed" from the reservoir into the measuring and dispensing chamber. Most conveniently, however, the conduit will run from a location proximate to the bottom of the reservoir to a location proximate the top of one of the walls of the measuring and dispensing chamber. Such wall is desirably the wall opposite the point from which liquid will be dispensed from the measuring and dispensing chamber and is commonly referred to as the "rear wall". and is desirably an inclined wall (which minimizes foaming) and not one on which the measurement markings are located.

In addition to minimizing the risk of foaming and thus of inaccurate measurement of the amount of liquid transferred to the measuring and dispensing chamber, the direction of the incoming liquid down a wall also avoids the risk of liquid splashing out of the measuring and dispensing chamber, which splashing can create a safety hazard.

There are a number of ways in which the liquid entering the measuring and dispensing chamber may be directed against the appropriate wall, for example by disposing the outlet from the conduit which brings liquid from the flexible reservoir chamber to the measuring and dispensing chamber such that it directs outgoing liquid against an appropriate wall or by locating a baffle in the measuring and dispensing chamber adjacent to the outlet so as to direct liquid entering the measuring and dispensing chamber against an appropriate wall.

It is also preferred that the outlet from the conduit into the measuring and dispensing chamber is located and oriented in such a way as to avoid turbulence in the liquid being introduced into the measuring and dispensing chamber so as to minimize the risk of foaming. This can be accomplished by releasing the liquid close to and directed almost parallel to a surface down which it can flow. By directing liquid entering the measuring and dispensing chamber in this way so as to run smoothly down a wall rather than being released into a void, one is minimizing the risk of foaming in the same way that one does when beer or champagne are poured into a tilted glass.

In order further to assist in ensuring that the correct quantity of liquid is dispensed from the measuring and dispensing chamber, it is preferred that the axis of dispensing outlet is parallel with the front wall of the measuring and dispensing chamber and that at least at one point on the edge of the outlet, there is a flush surface of the with front wall of the measuring and dispensing chamber. the axis of the dispensing outlet being oriented parallel to that wall and located at the point of intersection of that wall and the upper wall of the measuring and dispensing chamber. Furthermore it is often preferred that the front wall of the measuring and dispensing chamber is set at an angle to the vertical so as to make it easier to ensure that all liquid in the measuring and dispensing chamber can be poured out without the need completely to rotate the container by at least 90° as is required where the front wall is vertical and the outlet provided in the front wall or even more if the outlet is located in the top of the container to make sure that it is fully drained These features assist in making sure that none of the liquid that has been transferred to the measuring and dispensing chamber is retained in it when the chamber is emptied.

All of the above described features may usefully be combined with those described in our prior application Ser. No. 11/643,341 such that the conduit bringing liquid from the reservoir chamber to the measuring and dispensing chamber comprises at least two bends at spaced intervals along the path, or that the conduit is contoured to provide a trap to minimize 'suck back" when a the reservoir ceases being squeezed.

According to a still further aspect of the invention, there is provided a method of measuring and dispensing a predetermined quantity of liquid from a container having a flexible reservoir chamber, a measuring and dispensing chamber, and a conduit interconnecting said reservoir and measuring chambers, said method including the steps of pouring liquid through a filling opening into said reservoir chamber, sealing said filling opening, venting a pouring opening from said measuring chamber, squeezing said flexible reservoir chamber to force liquid from said reservoir chamber through said conduit into said measuring and dispensing chamber until the predetermined quantity has entered said measuring and dispensing chamber, said liquid being directed upon entry into the measuring and dispensing chamber against a wall of the measuring and dispensing chamber other than that bearing measurement markings, such wall down which the liquid is directed typically being the rear wall of the measuring and dispensing chamber, opening said pouring opening and tilting said container to dispense the measured amount of liquid from the measuring and dispensing chamber. while preventing additional liquid from passing said trap and from entering said measuring and dispensing chamber.

BRIEF DESCRIPTION OF THE DRAWINGS

Embodiments of the invention will now be described with reference to the accompanying drawings in which.

DESCRIPTION OF SPECIFIC EMBODIMENTS

Figure 1:
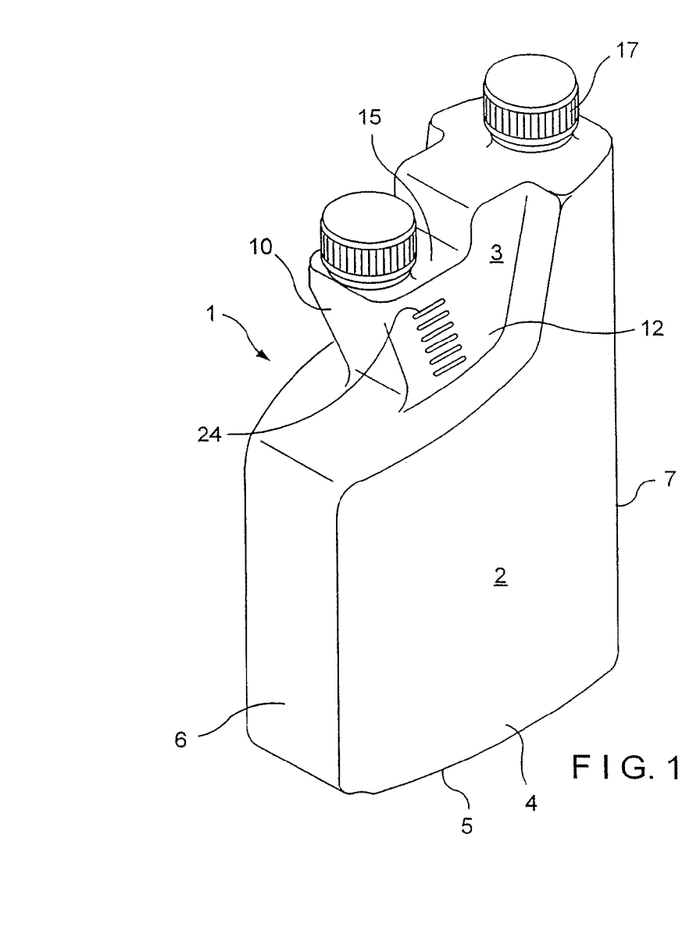
FIG. 1 shows a perspective view of a first embodiment of the invention in which the top surface wall of the measuring and dispensing chamber is shaped so as to direct incoming liquid to flow down the rear wall of the measuring and dispensing chamber.

Referring now to the drawings, FIG. 1 is a perspective view of a container of the invention which is used for storing, measuring, and dispensing a predetermined amount of liquid. The container 1 includes a reservoir chamber 2 and a measuring and dispensing chamber 3 in fluid communication therewith in a manner to be described hereinafter. The reservoir chamber 2 is defined by side walls 4 (only one side wall 4 being shown in the drawings), a bottom 5, a front wall 6, and a rear wall 7. It will be appreciated that, although only one side wall 4 is shown, the opposite side wall of the container is a mirror image thereof.

Figure 3:
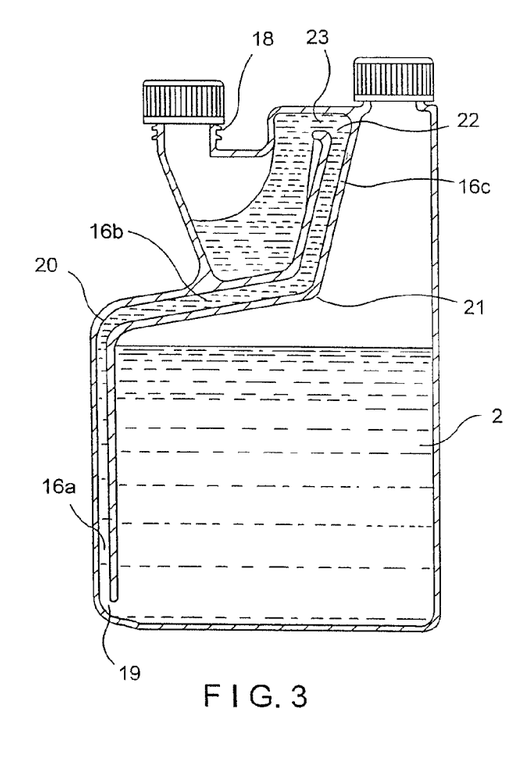
FIG. 3 is view similar to FIG. 2, but shows the step of measuring a predetermined quantity of liquid.
Figure 4:
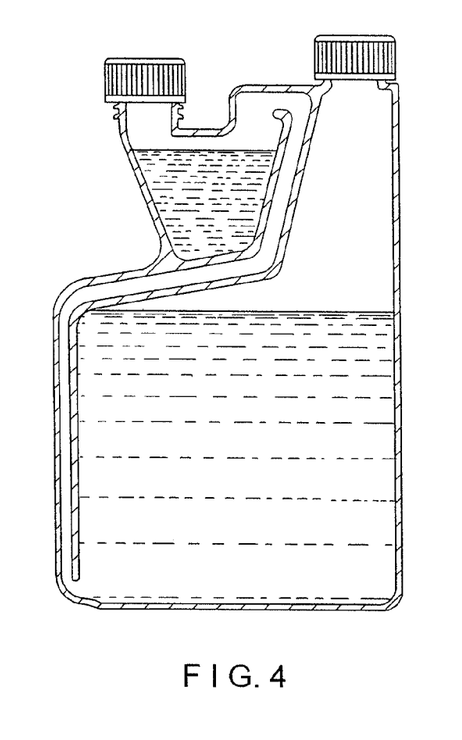
FIG. 4 is a view similar to FIG. 3, but shows the measuring step completed.

The top of the reservoir chamber is a more complex configuration and incorporates not only the measuring and dispensing chamber but also a filling passage 8 in a manner now to be described in greater detail. The measuring and dispensing chamber 3 is located above the main body of the reservoir chamber 2 and forwardly of the filling passage 8. The measuring and dispensing chamber 3 has a bottom 9 and front 10, rear 11, and side 12 walls upstanding therefrom. The front wall 10 extends upwardly and forwardly from the bottom 9 and leads to a dispensing outlet 13 which is sealingly closeable by a dispensing cap 14. Upper wall structure 15 completes the measuring and dispensing chamber and is shaped so as to provide a step down between the rear and front wall of the measuring chamber so as provide a vertical surface close to and opposite the outlet through which liquid enters the measuring chamber such that incoming liquid is directed to flow down the rear wall of the measuring and dispensing chamber as shown in FIG. 3.

A conduit which, at least in the embodiment of FIGS. 1 to 5 is in the form of an internal connecting tube 16, provides for the passage of liquid between the reservoir chamber and the measuring and dispensing chamber. As will be described hereinafter, at least the reservoir chamber 2 is flexible and is most conveniently a plastics molding.

A one-piece molding enables the tube 16 to be integrally formed with the reservoir chamber and measuring and dispensing chamber.

The reservoir chamber 2 is filled with liquid through the filling passage 8 which is sealingly closeable at its top by a filling cap 17. Both caps 14 and 17 may be internally threaded to mate with external screw threads on upstanding necks from the measuring and dispensing chamber and from the reservoir chamber respectively. Such a threaded neck portion 18 is most clearly shown in FIG. 5 of the drawings in which the dispensing cap 14 has been removed. Reliable hermetic sealing between the cooperating caps and necks can be effected by an O-ring or similar gasket structure not shown. These are, of course, examples only of releasably sealable cap components.

The angled configuration of the connecting tube 16 will now be described with reference to FIG. 3 of the drawings which shows the container and liquid during the step of transferring liquid from the reservoir chamber 2 to the measuring and dispensing chamber 3. The connecting tube provides a continuous passage having a first portion 16a which extends upwardly along the front wall 6 of the container 2 from an entrance 19 proximate the bottom 5 of the container to a first bend 20 proximate the top of the main body portion of the chamber 2. From the first bend 20, a portion 16b of the tube extends upwardly and rearwardly to pass below the measuring and dispensing chamber 3 to a second bend 21. From that second bend 21, a portion 16c of the tube extends upwardly along the rear wall 11 of the measuring and dispensing chamber 3 to terminate at a tube exit 22 proximate the uppermost extremity of said rear wall 11. The tube exit 22 is in direct communication with a passage 23 through which liquid exiting from the tube 16 enters the measuring and dispensing chamber 3.

Figure 2:
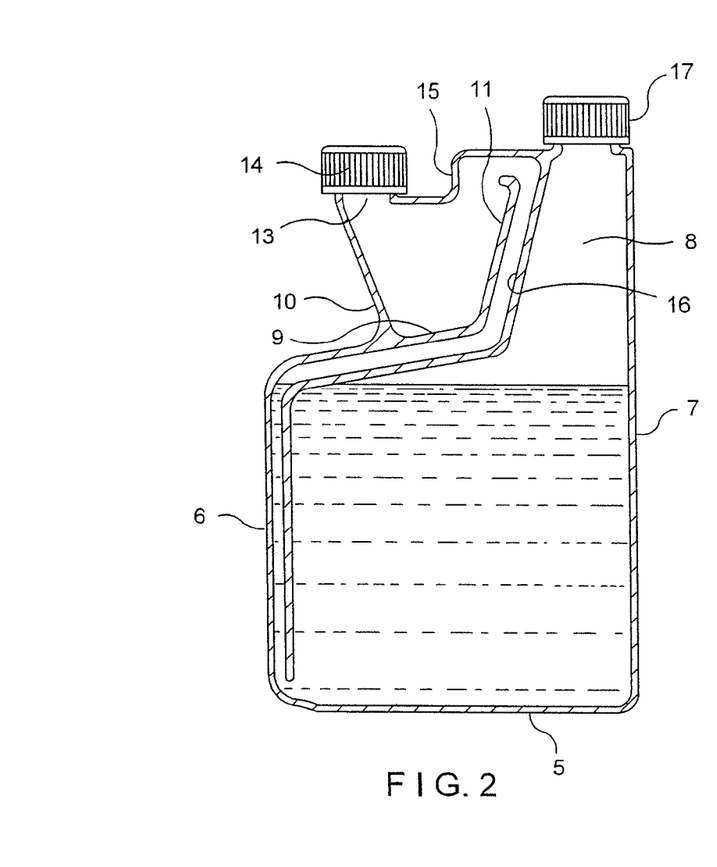
FIG. 2 is a sectioned, side elevation of the embodiment of FIG. 1.

The mode of operation of the first embodiment of the invention will now be described with specific reference to FIGS. 2 to 5 of the drawings. FIG. 2 shows the container 1 filled with liquid and in a storage state. In order to fill the liquid to the position shown in FIG. 2, the filling cap 17 is removed, whereupon liquid is poured through the neck exposed by the removed filling cap 17 through the filling passage 8 into the main body of the reservoir chamber. During this filling step the container is vented, either by air passage through the exposed neck or by loosening the dispensing cap 14. Thereupon, the filling cap 17 is replaced on its neck and both caps 14 and 17 are tightened to provide secure and hermetic seals.

When it is desired to measure a precise and predetermined amount of the liquid, the dispensing cap 14 is loosened but the filling cap 17 remains in its tightened state. The body of the reservoir chamber 2 is then squeezed and the flexible side walls 4 permit liquid to be forced from the reservoir chamber 2 upwardly and through the tube 16 to enter the measuring and dispensing chamber 3 through the passage 23 and down the rear wall 11 of the measuring and dispensing chamber 3 in the manner shown in FIG. 3 of the drawings. The squeezing of the flexible walls of the reservoir chamber is discontinued when the predetermined desired amount of the liquid has entered the measuring and dispensing chamber. One way to indicate the desired amount is to provide a graduated scale on a wall portion of the measuring and dispensing scale. Such a scale 24 is shown in FIG. 1 of the drawings and, with such scale, the container is molded from transparent or translucent plastics material whereby the level of liquid in the measuring and dispensing chamber can clearly be established with reference to the scale.

When the squeeze pressure on the container wall is released, surplus liquid in the passage 23 and tube 16 will be sucked back into the reservoir chamber by virtue of the vacuum created when the filling cap 17 is tightly sealed and the dispensing cap 14 is loosened. If careful scrutiny of the scale reveals that more liquid is necessary to complete the desired volume, then the container walls are again squeezed to introduce an appropriate amount of additional liquid through the tube 16 into the measuring and dispensing chamber 3. If, on the other hand, there is too much liquid in the measuring and dispensing chamber, the surplus amount can be poured back through the passage 23 by tilting the container 1 in a clockwise direction with reference to the illustration in FIGS. 2 to 4, i.e., in the opposite direction from the tilted direction shown in FIG. 5 where the container has been rotated in an anticlockwise direction. As the surplus liquid in the passage 23 and tube 16 had been "sucked back" into the reservoir chamber to adopt the liquid level position shown in FIG. 4 of the drawings, the rearward tilting of the container will cause surplus liquid to pass back through the passage 23 and down through the tube 16.

Figure 5:
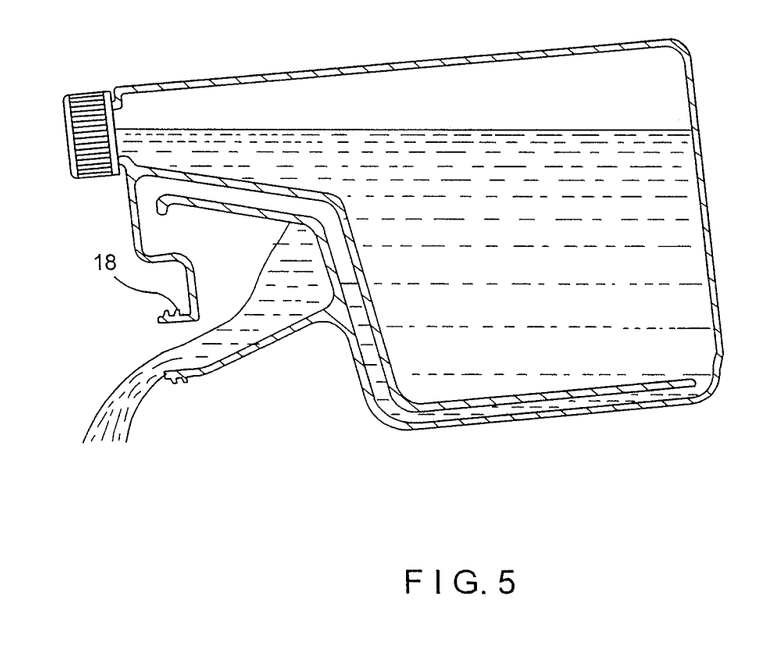
FIG. 5 shows the step of dispensing the measured quantity of liquid.
Figure 6:
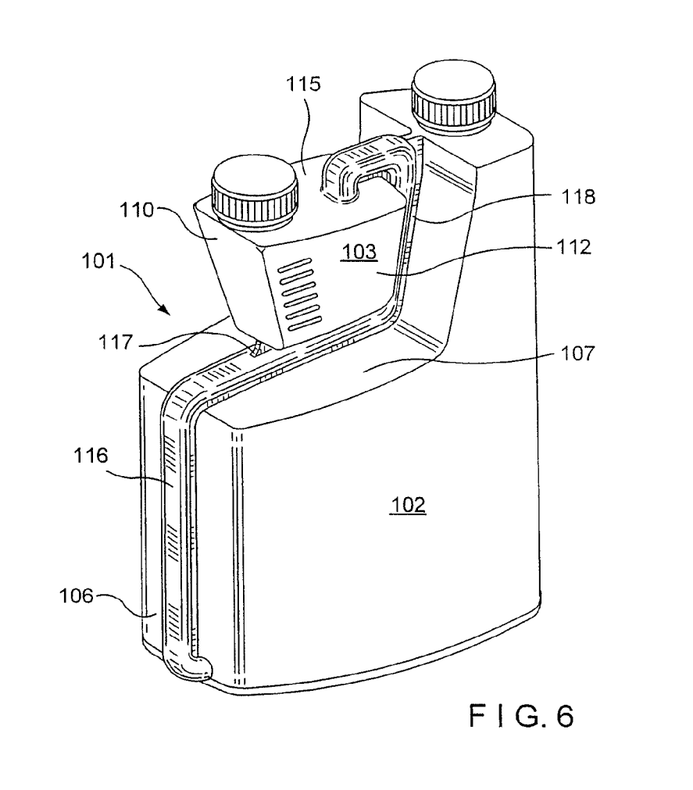
FIG. 6 is a perspective view of a second embodiment of the invention described in application Ser. No. 11/643,341.
Figure 7:
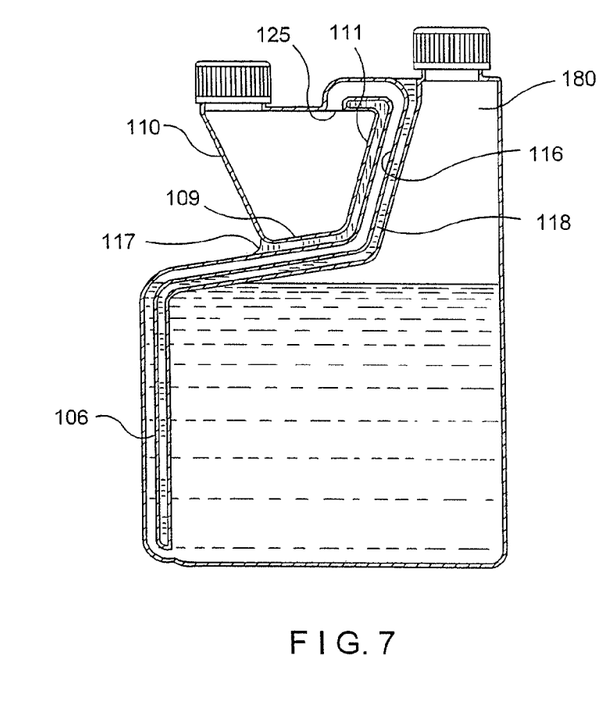
FIG. 7 is a sectioned, side elevation of the embodiment of FIG. 6.
Figure 8:
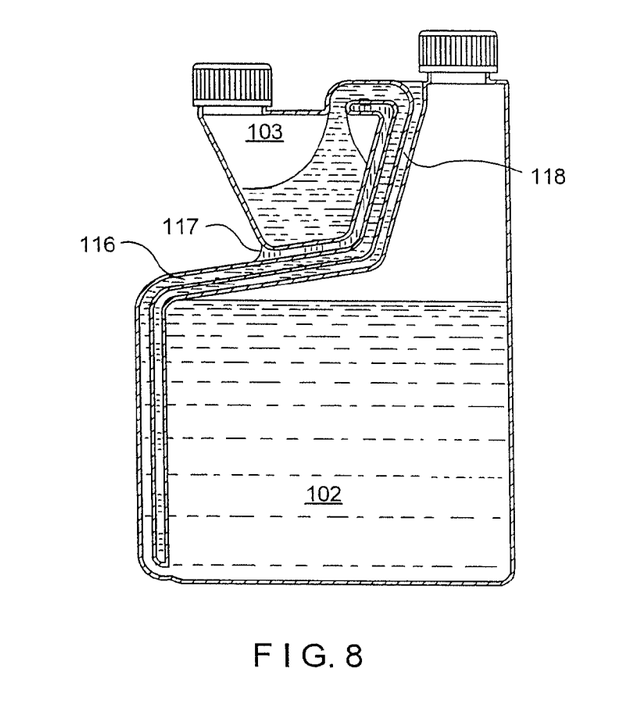
FIG. 8 is a view similar to FIG. 7, but shows the step of measuring a predetermined quantity of liquid.
Figure 9:
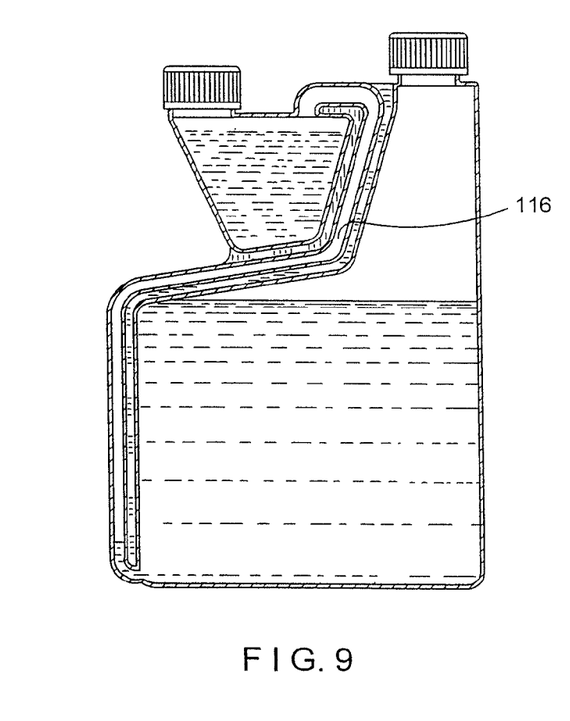
FIG. 9 is a view similar to FIG. 8, but shows the measuring step completed.

In order to dispense this measured amount of liquid, the dispensing cap 14 is then removed, the filling cap 17 remaining tightly sealed, and the container is tilted in an anticlockwise direction to adopt the position shown in FIG. 5 of the drawings where all liquid in the measuring and dispensing chamber will be dispensed but no additional liquid will enter the measuring and dispensing chamber since the vacuum existing in the reservoir chamber will not permit additional liquid to pass up to and through the passage and liquid in the tube will remain in the angled portion 16b of the tube as best shown in FIG. 5 of the drawings.

FIG. 5 most clearly shows how, with the filling cap 17 tightly sealed when the container is tilted to pour the measured quantity of liquid from the measuring and dispensing chamber 3, liquid in the tube 16 can rise only to a level between the first 20 and second 21 bends and cannot enter the measuring and dispensing chamber 3. The first and second bends 20, 21 thus provide a trap to prevent unwanted flow of the liquid.

Once the desired amount of the liquid has been dispensed, the dispensing cap 14 may be replaced to seal the dispensing outlet 13 and either the container can be stored with the remaining liquid in it or the dispensing cap 14 can be loosened and process repeated to measure and dispense a second amount of liquid.

The foregoing embodiment is particularly suitable for use with clear liquids. However, if the liquid is colored or opaque, there is a risk that when entering the measuring and dispensing chamber through the passage 23, the liquid will be propelled across the measuring and dispensing chamber by the squeezing driving force and will collide with the internal walls of the measuring dispensing chamber and will then run down those wall making it difficult to determined the actual level of liquid in said chamber. FIGS. 6 to 9 of the drawings depict a container of the type described in application Ser. No. 11/643,341 which provides one approach to this problem whereby liquid enters the measuring and dispensing chamber from the top and drops directly by gravity to the bottom of said chamber.

In this type of container, the overall configuration of the container is similar to that of the embodiment described with reference to FIGS. 1 to 5 of the drawings. Thus, the container 101 includes a flexible walled reservoir chamber 102 and a measuring and dispensing chamber 103 in fluid communication therewith.

The measuring and dispensing chamber 103 is located above the main body of the reservoir chamber 102 and forwardly of the filling passage 180. The measuring and dispensing chamber 103 has a bottom 109 and front 110, rear 111, and side 112 walls upstanding therefrom. Upper wall structure 115 completes the measuring and dispensing chamber.

A conduit in the form of a connecting tube 116 provides for the passage of liquid between the reservoir chamber and the measuring and dispensing chamber. The tube 116 is preferably integrally formed with the reservoir chamber and the measuring and dispensing chamber and lies on and upwardly along the front wall 106 of the reservoir chamber 102 and is then angled or bent to extend rearwardly between the upper wall 107 of the reservoir chamber 102 and the bottom wall 109 of the measuring and dispensing chamber 103. After passing rearwardly below the measuring and dispensing chamber 103, the tube 106 is again angled or bent to extend upwardly between the rear wall 111 of the measuring and dispensing chamber 103 and the adjacent wall portion defining the filling passage 180 of the reservoir chamber 102.

The container is preferably formed by molding and compressing molding will create webs or fillets 117, 118 which respectively space the tube 116 from the tube confining wall portions of the reservoir and measuring and dispensing chamber.

When the tube 116 emerges above the level of the upper wall 115 of the measuring and dispensing chamber 103 it is again angled or bent to extend over the upper wall 115 and then downwardly to enter the measuring and dispensing chamber through an opening 125 in the upper wall 115 thereof. With this configuration, liquid pouring through the tube in a manner to be described hereinafter will enter the measuring and dispensing chamber 103 from above as most clearly shown in FIG. 8 of the drawings.

The mode of operation of this preferred embodiment of the invention is the same as that described with reference to FIGS. 2 to 5 of the drawings. For this reason detailed description of the screw threaded necks and hermetically sealable caps is not repeated. The important difference between the embodiments shown in FIGS. 1 to 5 on the one hand and FIGS. 6 to 9 on the other hand is that, when the body of the reservoir chamber 102 is squeezed and the flexible side walls permit liquid to be forced from the reservoir chamber 102 upwardly and through the tube 116 to enter the measuring and dispensing chamber 103 in the manner shown in FIG. 8 of the drawings, the liquid enters the measuring and dispensing chamber downwardly from the top thereof, and splash and undesirable coating of the side, front, and rear walls of the said measuring and dispensing chamber is minimized.

Figure 10:
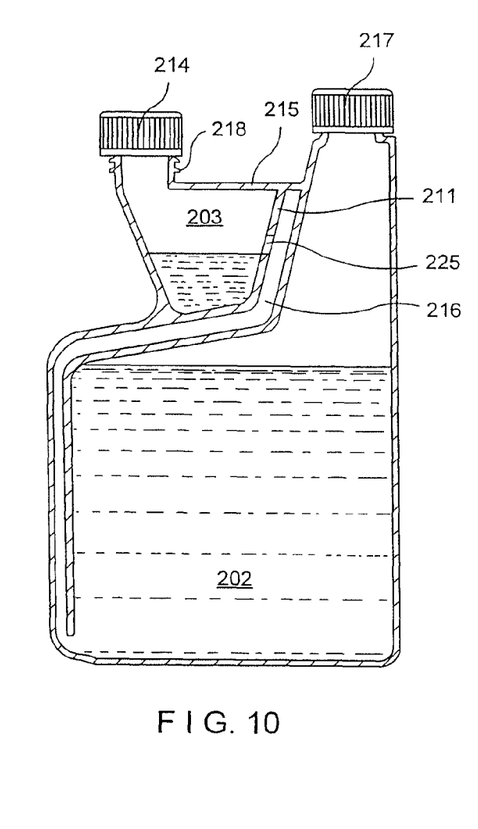
FIG. 10 is view similar to FIG. 2, but shows a side elevation through a third embodiment of the invention described in application Ser. No. 11/643,341.

FIG. 10 of the drawings shows another embodiment of the invention of application Ser. No. 11/643,341 in which the passage 23 described with reference to the embodiment shown in FIGS. 1 to 5 is eliminated and the rear wall 211 of the measuring and dispensing chamber 203 extends up to and is sealed to the upper wall structure 215 of said measuring and dispensing chamber 203. In this embodiment an aperture or "bleed-hole" 225 is formed in the rear wall 211 of the measuring and dispensing chamber 203 and provides fluid communication between the interior of the measuring and dispensing chamber 203 and tube 216.

The operation of the this embodiment differs only from that of the embodiment described with reference to FIGS. 1 to 5 only in that, upon squeezing the container, liquid is forced from the reservoir chamber 202 through the tube 216 and then through the aperture 225 into the measuring and dispensing chamber 203. With the dispensing cap 214 loosened on the screw-threaded neck 218 and hence venting the measuring and dispensing chamber 203 to atmosphere, when the measuring and dispensing chamber 203 is filled with an amount of liquid in excess of the predetermined desired amount, release of squeezing pressure on the container will suck back excess material through the aperture 225 and tube 216 into the reservoir chamber 202. In this case no illustrative graduated scale on the measuring and dispensing chamber is necessary since the location of the aperture 225 will determine the desired and controlled amount of liquid in that chamber.

The preferred construction of this embodiment utilizes the described aperture or "bleed-hole" 225 in the rear wall 211 which is sealed to the upper wall structure 215 of the measuring and dispensing chamber 203. However, instead of an aperture 125 in the wall 211, the wall could terminate at the level of the aperture to form a weir which would limit the volume of liquid in the measuring and dispensing chamber by permitting surplus liquid to cascade back over the weir to enter the tube 216.

Figure 11:
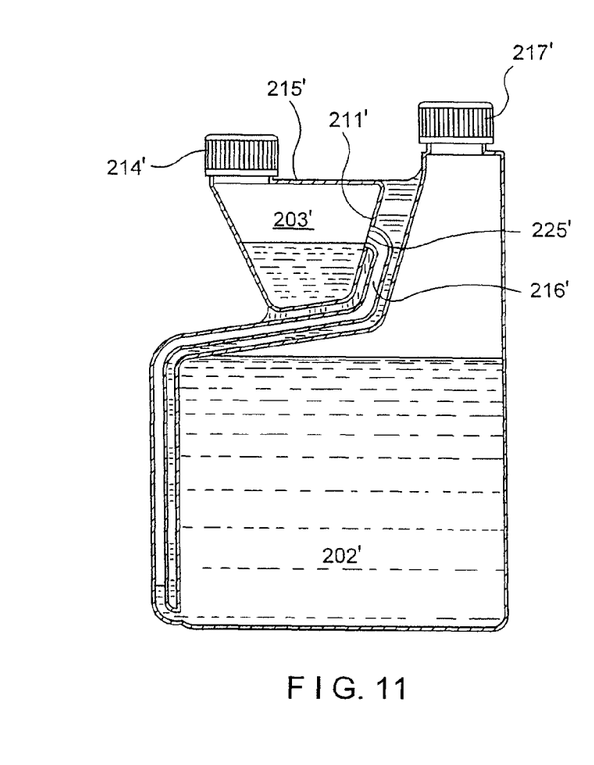
FIG. 11 is a view similar to FIG. 10, but shows a modification.

FIG. 11 of the drawing shows a further embodiment of the invention of application Ser. No. 11/643,341 similar to that shown in FIG. 10 in which the tube 216' does not extend to the upper wall 215' of the measuring and dispensing chamber but, instead, the rear wall 211' of the measuring and dispensing chamber 203' extends up to and is sealed to the upper wall structure 215' of said measuring and dispensing chamber 203'. In this embodiment the aperture or "bleed-hole" 225' is similarly formed in the rear wall 211' of the measuring and dispensing chamber 210' and provides fluid communication between the interior of the measuring and dispensing chamber 203' and tube 216'. The principal difference between the embodiments shown in FIG. 10 on the one hand and FIG. 11 on the other hand is the spacing between the measuring and dispensing chamber 203' and the reservoir chamber 202' with the tube 216' therebetween. This spacing is created by the webs or fillets created by the compressing molding in the same manner as the webs or fillets 117, 118 in the embodiment shown in FIGS. 6 to 9.

Figure 12:
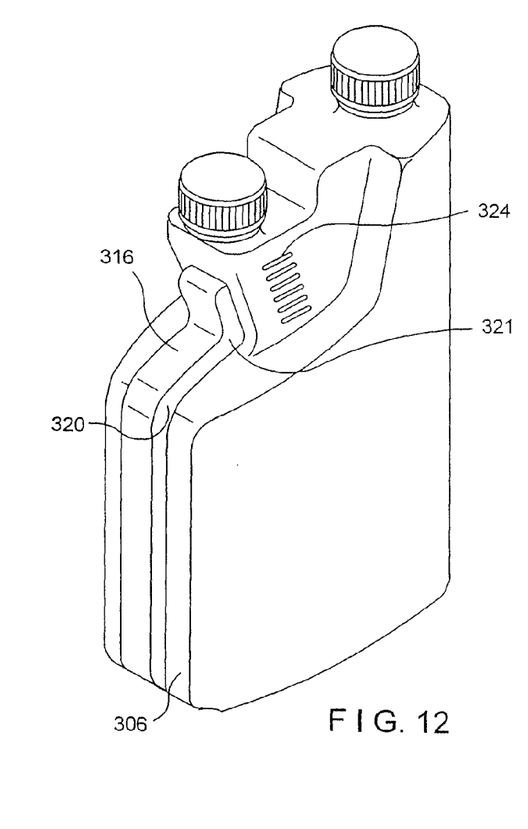
FIG. 12 is a view similar to FIG. 1, but shows a still further embodiment of the invention described in application Ser. No. 11/643,341.
Figure 13:
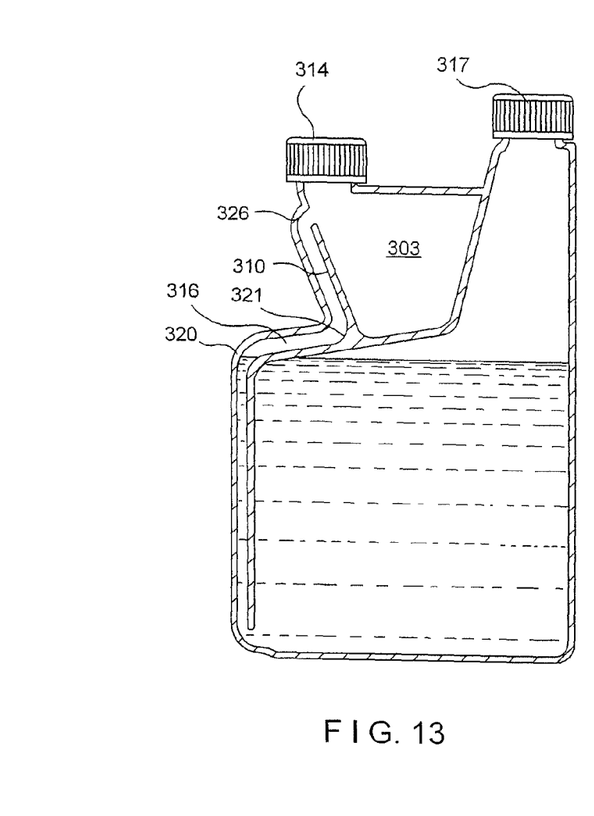
FIG. 13 is a sectioned, side elevation through the embodiment of FIG. 12.
Figure 14:
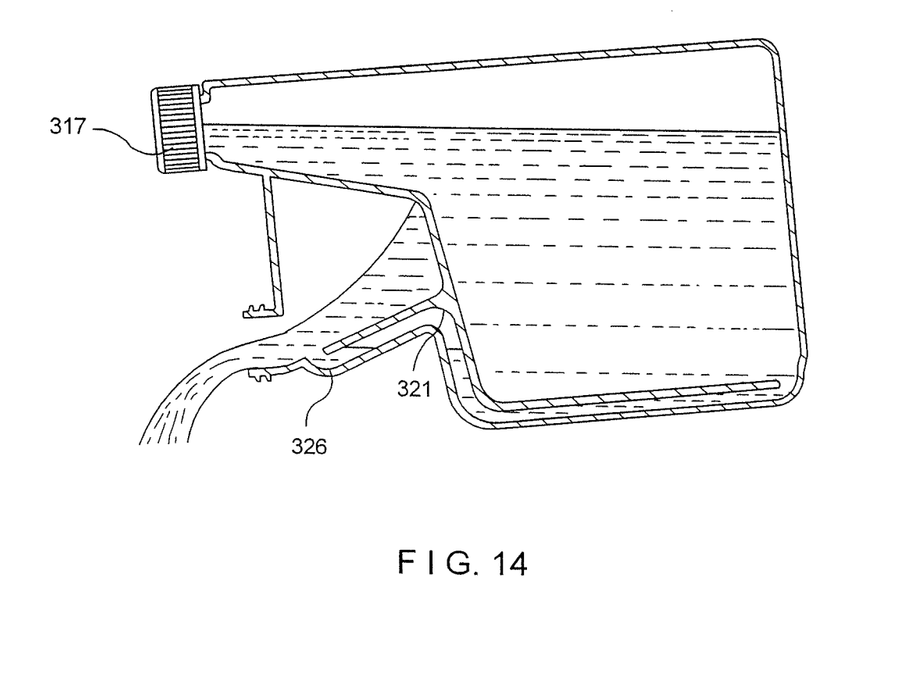
FIG. 14 shows the step of dispensing the measured quantity of liquid for the embodiment of FIGS. 12 and 13.

FIGS. 12 to 14 illustrate a further embodiment of the invention of application Ser. No. 11/643,341 with a different configuration in which the tube 316 again is angled twice to present first and second bends 320 and 321. In this particular configuration, however, that section of the tube between the first and second bends 320, 321 does not pass below the measuring and dispensing chamber 303 and, instead of extending upwardly and rearwardly along the rear wall of the measuring and dispensing chamber, extends upwardly and forwardly along the front wall 310 to enter, at its uppermost end, into the upper region of the measuring and dispensing chamber 303. Although FIGS. 12 to 14 show the tube 316 located externally up and along the front wall 306 of the reservoir chamber, it could alternatively be molded within the reservoir chamber in the manner of FIGS. 1 to 5. A similar arrangement of the conduit could be used for the containers of the present invention as long as means such as a baffle or the orientation of the outlet from the conduit into the measuring and dispensing chamber are provided to cause liquid entering the measuring and dispensing chamber to flow down one of the walls thereof.

Again, a graduated scale 324 is utilized in conjunction with transparent or translucent walls to permit a visual observation of the amount of liquid which has entered the measuring and dispensing chamber and to enable that amount of liquid to be adjusted to achieve the desired predetermined amount. When this measured amount has been achieved, the squeezing force on the container is relieved and, with the filling cap 317 firmly sealed and the dispensing cap 314 loosened, liquid will be sucked back by virtue of the vacuum created above the liquid in the reservoir chamber substantially to clear the tube 316. When the dispensing cap 314 is removed and the container tilted forwardly to adopt the position shown in FIG. 14 of the drawings, liquid within the measuring and dispensing chamber will flow out of said chamber through the neck which has been opened by removal of cap 314. Although the liquid will flow over the opening through which liquid has entered the measuring and dispensing chamber from the tube 316, it will not flow back into the reservoir by virtue of the angle created by the second bend 321 which, effectively, creates a trap 330 which prevents either surplus liquid from the reservoir escaping the vacuum created by the tightened cap 317 to enter the measuring and dispensing chamber or any liquid which has entered the tube 316 through the opening into the measuring and dispensing chamber from returning to the reservoir. In fact, the angled wall portion 326 ensures that, upon appropriate forward tilting of the container, any such liquid which entered the tube will be poured out of the tube and through the open neck.

Figure 15:
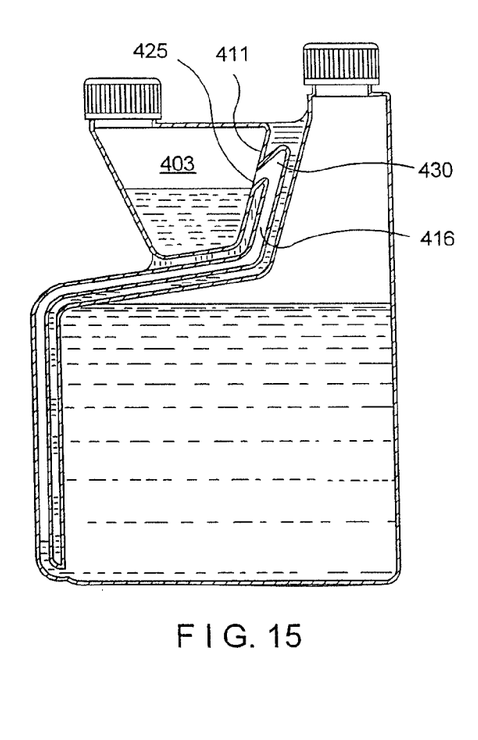
FIG. 15 is a sectioned side elevation similar to FIG. 2 and shows an embodiment of the present invention.

The advantages of directing liquid downwardly into the measuring and dispensing chamber have already been described with reference to the embodiment shown in FIGS. 6 to 9. FIG. 15 shows an alternative to the embodiment shown in FIG. 11 in which the exit end of the tube 416 is angled downwardly to deliver liquid into the measuring and dispensing chamber 403 in a downward direction. But in this case by directing the flow down the rear wall of the measuring and dispensing chamber. This is accomplished by the embodiment shown in FIG. 15 without compromising the accuracy of the measured amount. Even though the inverted "U-bend" 430 is above the lowest extremity of the opening 425 through the rear wall 411, it is below the uppermost extremity of said opening.

The foregoing description of embodiments describes an improved container in which an amount of liquid can be carefully determined and collected in a measuring and dispensing chamber with any surplus liquid forcibly returned to the reservoir chamber and then dispensed from the measuring and dispensing chamber. In all of the illustrated embodiments of the invention, it will be noted that the closeable necks with their caps 14, 17; 214, 217; 214', 217'; 314, 317 are not at the same level when the container is standing upright on its bottom. The advantage of these offset dispensing and filing nozzles and caps is that it greatly facilitates manufacture of the container by allowing the dispensing cap to be applied to the respective necks at the conclusion of a molding process without being impeded by structural apparatus provided to apply the filing caps. Pragmatically, this means that the dispensing cap can be screwed on to its neck during manufacture of the container and the container can then be supplied to a purchaser who will, at a later stage and remote location, fill the reservoir chamber with a desired amount and then apply the filing cap separately.

Figure 16:
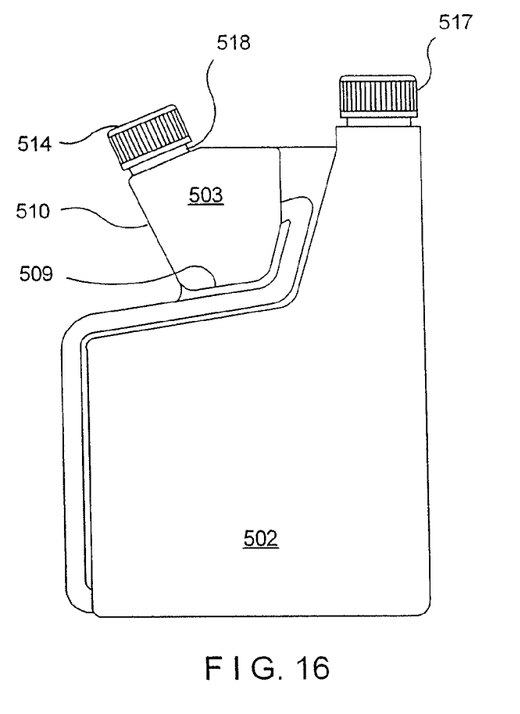
FIG. 16 is a side elevation of a modification of the embodiment shown in FIG. 15.

FIG. 16 shows a minor modification of the embodiment shown in FIG. 15 in which the dispensing neck 518 which receives the dispensing cap 514 is angled with respect to the neck which receives the filling cap 517. In the embodiment shown in FIG. 16, the axis of the dispensing neck 518 is substantially parallel to the front wall 510 of the measuring and dispensing chamber 503 which is angled upwardly and forwardly from the bottom 509 of the measuring and dispensing chamber 503. This angling of the dispensing neck 518 facilitates dispensing from the chamber 503 and encourages complete dispensing of the liquid measured in that chamber.

Figure 17:
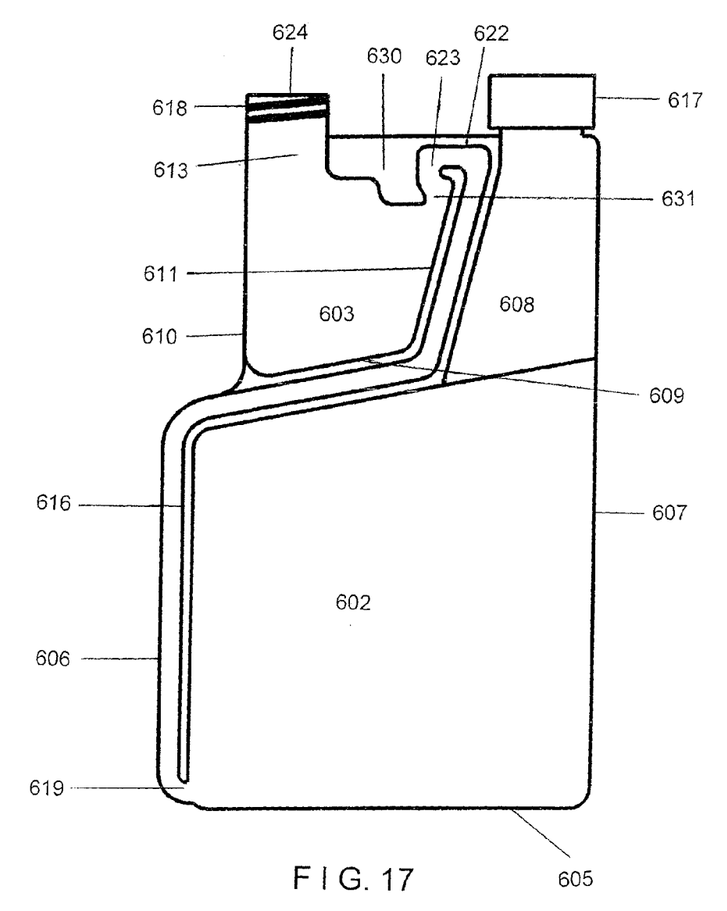
FIG. 17 is a sectioned side elevation of an embodiment of the present invention similar to FIG. 2 in which a baffle is included to direct incoming liquid down the back wall of the measuring and dispensing chamber.

FIG. 17 is a sectioned, side elevation of an embodiment of the invention. The container 601 includes a reservoir chamber 602 and a measuring and dispensing chamber 603 in fluid communication therewith in a manner to be described hereinafter. The reservoir chamber 602 is defined by side walls (not shown), a bottom 605, a front wall 606, and a rear wall 607.

The top of the reservoir chamber is a more complex configuration and incorporates not only the measuring and dispensing chamber but also a filling passage 608 in a manner now to be described in greater detail. The measuring and dispensing chamber 603 is located above the main body of the reservoir chamber 602 and forwardly of the filling passage 608. The measuring and dispensing chamber 603 has a bottom 609, a vertical front wall 610, an inclined rear wall 611, and side walls (not shown) upstanding therefrom. The front wall 610 extends upwardly from the bottom 609 and leads to a dispensing outlet 613 which is sealingly closeable by a dispensing cap which may be screwed on to a screw thread 618 surrounding the dispensing outlet 624. Upper wall structure 615 completes the measuring and dispensing chamber.

A conduit 616, provides for the passage of liquid between the reservoir chamber and the measuring and dispensing chamber. At least the reservoir chamber 602 is flexible and is most conveniently a plastics molding. The upper wall 615 of the measuring and dispensing chamber 603 is provided with a baffle 630 shaped so that liquid from the outlet passage 323 from the conduit 616 is directed to flow down the rear wall 611 of the measuring and dispensing chamber 602.

A one-piece molding enables the tube 616 to be integrally formed with the reservoir chamber and measuring and dispensing chamber 603.

The conduit 616 will be of any convenient configuration running from an entrance 619 proximate the bottom 605 of the reservoir to an outlet 631 proximate the top of the rear wall 611 of the measuring and dispensing chamber 603. upwardly and along the rear wall 11 of the measuring and dispensing chamber 603 to terminate at a tube exit 622 proximate the uppermost extremity of said rear wall 611. The tube exit 622 is in direct communication with a passage 623 through which liquid exiting from the tube 616 enters the measuring and dispensing chamber 603.

The reservoir chamber 602 is filled with liquid through the filling passage 608 which is sealingly closeable at its top by a filling cap 617. As note above, dispensing outlet 624 may also be closed by a similar cap. Both caps may be internally threaded to mate with external screw threads on upstanding necks from the measuring and dispensing chamber and from the reservoir chamber respectively. Reliable hermetic sealing between the cooperating caps and necks can be effected by an O-ring or similar gasket structure not shown. These are, of course, examples only of releasably sealable cap components.

Figure 18:
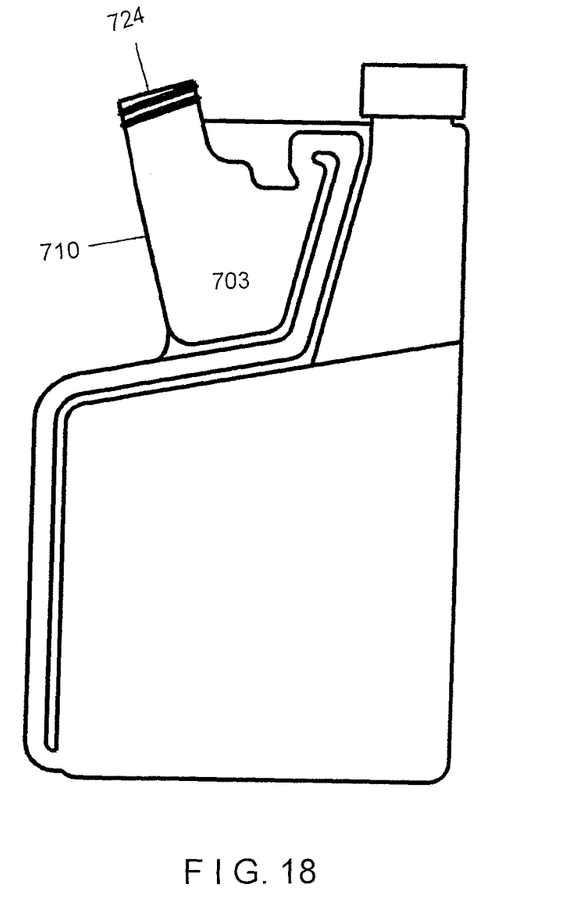
FIG. 18 is a sectioned side elevation similar to FIG. 17 but shows a further embodiment with a different dispensing outlet.

FIG. 18 is a sectioned side elevation of an embodiment of the invention similar to that shown in FIG. 17 except that the front wall 710 of the measuring and dispensing chamber 703 is angled forwardly and the axis of the dispensing outlet 724 is angled parallel to the front wall thereby facilitating dispensing of liquid from the measuring and dispensing chamber without having to tilt the container as far as is required with the container of FIG. 17 and minimizing the risk of liquid being retained in the measuring and dispensing chamber when liquid is poured from it similar to what is described with reference to FIG. 16.

Figure 19:
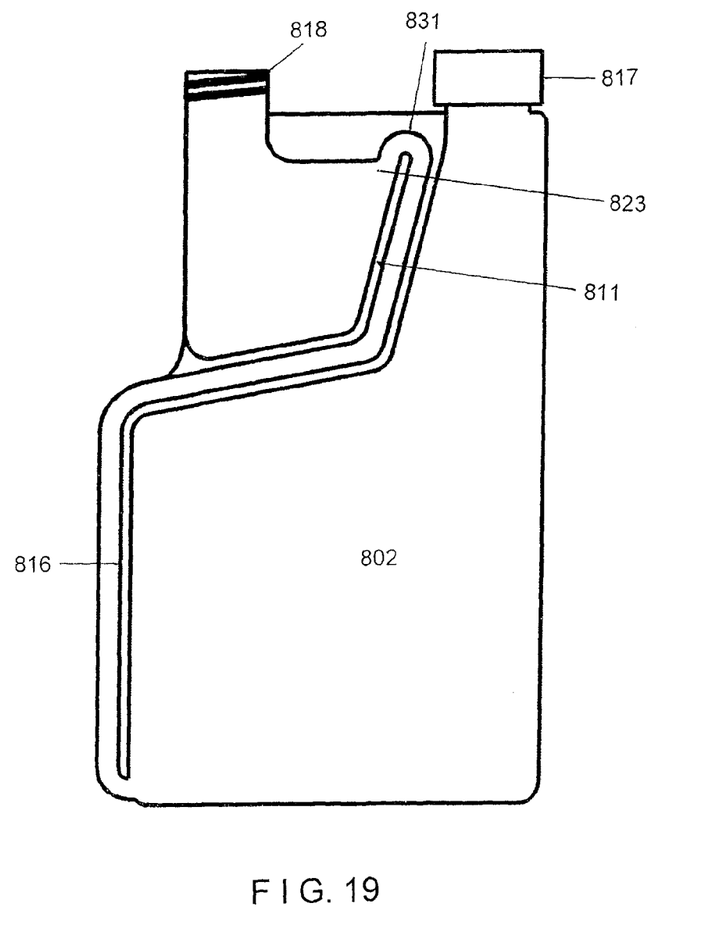
FIG. 19 is a sectioned side elevation similar to FIG. 2 but shows a further embodiment in which the inlet to the measuring and dispensing chamber is oriented to cause incoming liquid to flow down the back wall of the measuring and dispensing chamber.
Figure 20:
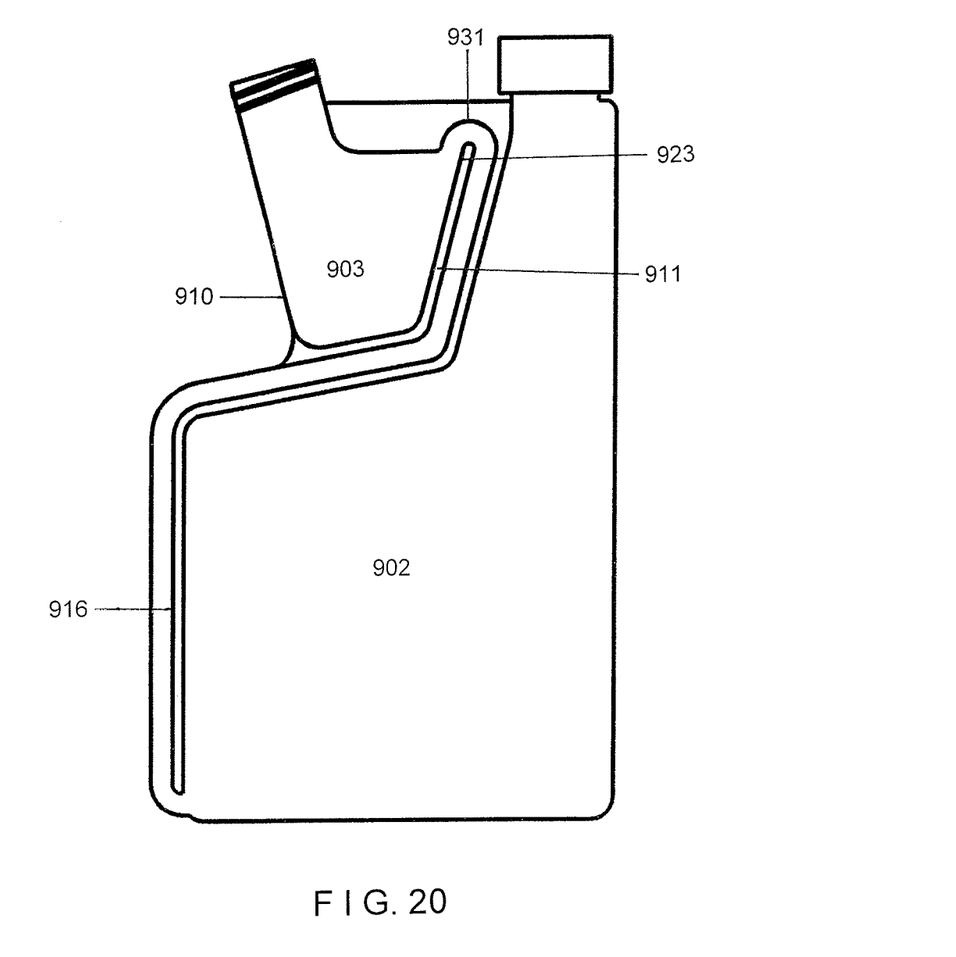
FIG. 20 is a sectioned side elevation similar to FIG. 19 but shows a further embodiment with a different dispensing outlet.

FIGS. 19 and 20 show variants of what is shown in FIGS. 1 and 16 in which in FIG. 19, the conduit 816 passes through a point 831 higher that at which the outlet passage 831 exits into the measuring and dispensing chamber 803 so as to assist in directing the flow of liquid that exits from outlet passage 831 to flow down the rear wall 811 of the measuring and dispensing chamber 803 and in FIG. 20 the conduit 916 passes through a point 931 higher that at which the outlet passage 923 exits into the measuring and dispensing chamber 903 so as to assist in directing the flow of liquid that exits from outlet passage 923 to flow down the rear wall 911 of the measuring and dispensing chamber 903.

In all of the above-described embodiments, the bends (angles) in the tube control the level of liquid in the tube and thereby prevent uncontrolled entry of liquid into the measuring and dispensing chamber when the container is tilted to pour a measured amount of liquid from the measuring and dispensing chamber.

The invention claimed is:

1. A measuring and dispensing container comprising:
a flexible walled reservoir chamber having a front wall and a rear wall and an inlet through which the reservoir may be filled,
a measuring and dispensing chamber mounted on the front wall of said reservoir and having a dispensing outlet on or adjacent to a first "front" wall remote from said reservoir and a second "rear" wall proximate to said reservoir and opposite to said front wall, at least one wall of which bears measurement markings, the reservoir chamber and the measuring and dispensing chamber being in a horizontal side-by side relation with each other so that the rear wall of the measuring and dispensing chamber faces or abuts the front wall of the reservoir chamber and
a conduit for transferring liquid from said reservoir chamber to said measuring and dispensing chamber having an inlet through which liquid enters the measuring and dispensing chamber, wherein said inlet is configured so that a stream of liquid entering the measuring and dispensing chamber from said conduit is directed to cause it to run down a wall of the measuring and dispensing chamber, wherein the wall against which the liquid is directed is inclined to the vertical, and wherein the conduit for transferring liquid from said reservoir chamber to said measuring and dispensing chamber extends upwardly to a bend having top and bottom portions disposed above the inlet and then extends downwardly such that liquid traveling through the bend passes above the inlet and is then directed downwardly against the inclined wall of the measuring and dispensing chamber.

2. A measuring and dispensing container as claimed in claim 1, wherein the wall against which the liquid is directed is the rear wall of the measuring and dispensing chamber.

3. A measuring and dispensing container as claimed in claim 1, wherein the direction of liquid entering the measuring and dispensing chamber is effected by orienting the inlet into the measuring and dispensing chamber through which liquid is transferred from the reservoir chamber to the measuring and dispensing chamber with an angle of entry such as to direct incoming liquid against the rear wall of the measuring and dispensing chamber.

4. A measuring and dispensing container as claimed in claim 3, wherein the portion of the conduit adjacent to said inlet is disposed at substantially the same angle to the vertical as is the angle of the inlet.

5. A measuring and dispensing container as claimed in claim 1, wherein the dispensing outlet from the measuring and dispensing chamber is located at the top of the front wall of the measuring and dispensing chamber.

6. A measuring and dispensing container as claimed in claim 1, wherein said conduit has at least two bends at spaced intervals along the length thereof.

7. A measuring and dispensing container as claimed in claim 1, wherein the measuring and dispensing chamber is located above the reservoir chamber and wherein the conduit is a tube which extends upwardly along a first wall of said reservoir chamber to a first bend and extends from said first bend rearwardly below said measuring and dispensing chamber to a second bend and extends from said second bend upwardly along a rear wall of said measuring and dispensing chamber to an entrance into said measuring and dispensing chamber.

8. A measuring and dispensing container as claimed in claim 6, wherein the conduit is a tube which enters the measuring and dispensing chamber in the upper region thereof.

9. A measuring and dispensing container as claimed in claim 8, wherein the measuring and dispensing chamber is closed at the top by wall structure and wherein the tube enters the chamber through said top wall structure to direct liquid downwardly into said measuring and dispensing chamber.

10. A measuring and dispensing container as claimed in claim 7, wherein the tube is located externally of the reservoir chamber.

11. A measuring and dispensing container as claimed in claim 10, wherein the reservoir chamber, the tube and the measuring and dispensing chamber comprise an integrally molded unit.

12. A measuring and dispensing container as claimed in claim 10, wherein the reservoir chamber, the tube and the measuring and dispensing chamber are an integral unit formed by compression molding, and wherein the tube passes between said reservoir chamber and measuring and dispensing chamber above said reservoir chamber and below said measuring and dispensing chamber and is spaced from said chambers by webs formed by said compression molding.

13. A measuring and dispensing container as claimed in claim 6, wherein a filling passage extends into said reservoir chamber and is closeable by a filling cap and wherein a dispensing outlet extends from said measuring and dispensing chamber and is closeable by a dispensing cap.

14. A measuring and dispensing container as claimed in claim 1, wherein the measuring and dispensing chamber is located above the reservoir chamber and wherein the conduit is a tube which extends upwardly along a forward wall of the reservoir chamber to a first bend and extends from said first bend rearwardly toward the bottom of said measuring and dispensing chamber to a second bend and extends from said second bend upwardly along a forward wall of said measuring and dispensing chamber to an entrance into said measuring and dispensing chamber.

15. A measuring and dispensing container according to claim 1, wherein said conduit is contoured to define a trap between said reservoir and said measuring and dispensing chambers whereby, when a predetermined amount of liquid has been transferred from the reservoir to the measuring and dispensing chamber, no further liquid will pass through said conduit while liquid is being dispensed from the measuring and dispensing chamber.

16. A measuring and dispensing container as claimed in claim 1 wherein said conduit provides the sole means for passage of liquid from the reservoir to the measuring and dispensing chamber.

* * * * *